Nov. 4, 1941.  W. LÜTY  2,261,264
MANUFACTURE OF LAMINATED PRODUCTS
Filed May 2, 1939
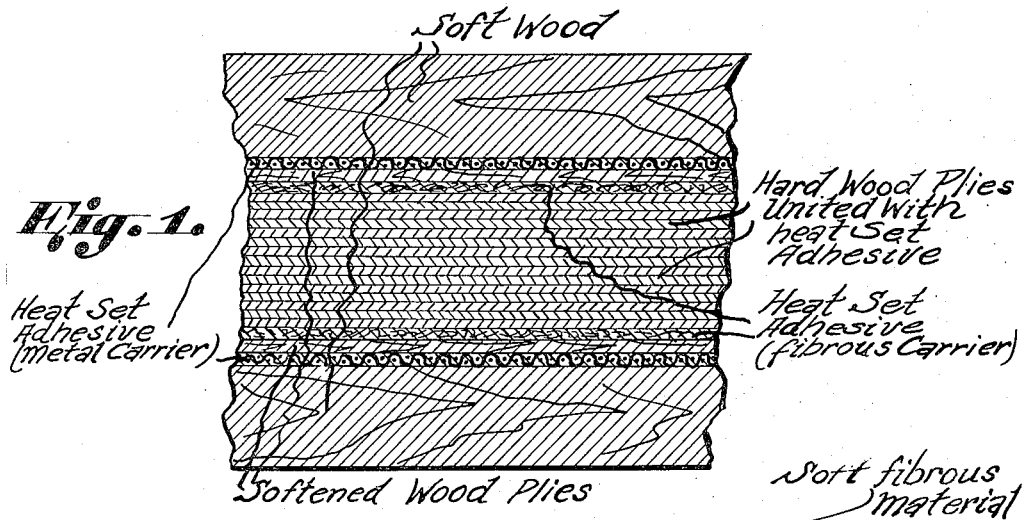
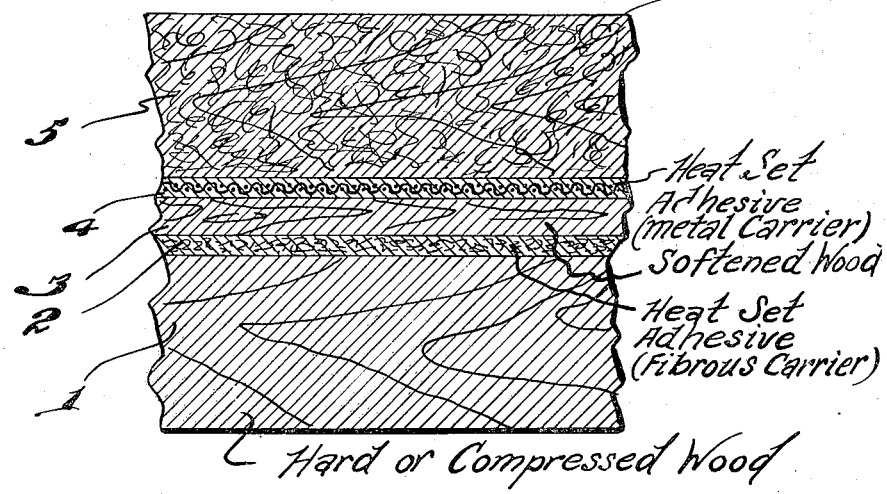
INVENTOR,
Willy Lüty
BY
Henry C. Parker
ATTORNEY.

Patented Nov. 4, 1941

2,261,264

UNITED STATES PATENT OFFICE 2,261,264

MANUFACTURE OF LAMINATED PRODUCTS

Willy Lüty, Essen-Bredeney, Germany, assignor, by mesne assignments, to Th. Goldschmidt Corporation, New York, N. Y., a corporation of Delaware Application May 2, 1939, Serial No. 271,367
In Germany May 10, 1938

3 Claims. (Cl. 154—2)

This invention relates to manufacture of laminated products; and it comprises a method of making compound lumber, such as ply-wood, for example, from fibrous layers differing substantially in hardness. As applied to the manufacture of ply-wood my process comprises uniting a layer of soft wood with a wooden layer, which is either of hard wood or of wood which has been hardened by being subjected to high pressure, by interposing between said layers a heat-setting adhesive, which may advantageously be in the form of a carrier sheet of open-textured fibrous material impregnated with a phenol-formaldehyde resin in its initial stage of condensation, subjecting the resulting assembly to heat and pressure to produce fusion and eventual setting of said adhesive, thereby firmly uniting said layers with a hard, insoluble and infusible bond, said pressure being sufficient to produce penetration of said adhesive and incidental hardening of said soft wood layer, and then softening the latter layer, usually by subjecting it to steam; said softened layer then being united, if desired, with a layer of soft wood by interposing a heat-setting adhesive, which may be in the form of a foraminous metal carrier-sheet coated with said adhesive, and subjecting the assembly to pressure while heating said adhesive by the passage of an electric current through said metal sheet, thereby producing a firm bond between said soft wood layer and said softened wood layer, the pressure used being below those producing substantial hardening of said layers and below the pressure employed in the initial heat-and-pressure step. The invention also includes the laminated products produced by the said process, said products comprising a hard fibrous layer and a steam-softened fibrous layer united thereto by means of a hard, insoluble and infusible bond comprising a film of a heat-set adhesive; all as more fully hereinafter set forth and as claimed.

While the production of ply-wood and the like from fibrous layers of substantially equal hardnesses has been highly developed during the past few years, it has been considered impossible to produce such products from materials of substantially different hardness by the use of adhesives setting under the application of heat and pressure. In the process of producing ply-wood for example, with heat-setting adhesives by the improved methods described in the U. S. patent to Weber et al., No. 1,960,176, it has been found necessary to apply higher pressures with hard woods than with soft woods. In fact the pressures required to produce sufficient penetration of the adhesive into hard woods to effect a permanent bond are also sufficiently high to substantially harden a soft wood. In other words, if it is attempted to unite a hard wood layer with a soft wood layer by means of a sheeted adhesive of the phenol-formaldehyde type, the resultant product is composed of two hard wood layers, owing to the hardening of the soft wood by the high pressures required during the heat-and-pressure step. If two soft wood layers are to be united, this can be accomplished without difficulty since the pressures required to produce penetration of the adhesive are much lower and do not produce appreciable hardening of the soft wood. But in the case of woods which have been hardened by compression it has been found that the pressures required during the heat-and-pressure step to produce satisfactory penetration of a heat-setting adhesive are substantially equal to those which were used initially in the hardening process.

There has long been a demand in the art for laminated products composed of layers of fibrous-material of different hardness. In making aeroplane propellers, for example, it is necessary that the inner wooden layers, which are joined to the shaft, be made of hard pressed wood while the outer layers may consist of a softer wood. The problem of producing such articles is solved by the present invention.

I have found that laminated products composed of fibrous layers of substantially different hardness, such as wood, for example, can be produced by first uniting a soft wood veneer of poplar, for example, with a layer of hard wood or of wood that has been hardened. This may be accomplished in the usual manner by applying a heat setting adhesive between the layers and applying heat and pressure. The high pressure required in this step causes the soft veneer to become hard but this is then softened without damage to the bond by treatment with steam, for example, and then another soft wood layer may be united with the softened layer by the same method but with the use of reduced pressures which are below those causing the hardening of the soft wood or of the softened wood. In this manner it is possible to obtain a satisfactory and permanent bond between a hard wood or a highly compressed wood layer with a layer of substantially less hardness which may be of wood or of other fibrous material. This process can evidently be applied in the uniting of sheets or layers of fibrous materials of various types, such as paper board, products made from bagasse, exploded wood, comminuted wood and other materials which are hardened by the application of pressure but which can be subsequently softened by the application of steam or other means without damaging the heat-set adhesive which is used in the process.

Any of the usual heat-setting adhesives can be used in my process, such as the phenol-formaldehyde and the urea-formaldehyde resins. It is advantageous to use a water resistant adhesive of the artificial resin type. These adhesives are conveniently used in sheet form with or without carrier sheets. A satisfactory sheeted adhesive for use in my process can be made by impregnating a thin, open-textured fibrous material with a phenol-formaldehyde resin in its initial stage of condensation, as described in the acknowledged patent to Weber, for example. This sheet of adhesive is interposed between the plies to be united and the assembly is placed in the usual press provided with heated platens. Heat is applied externally by heating the platens and sufficient pressure is used to cause the adhesive to fuse and to penetrate the plies, this pressure varying with the hardness of the parts to be united. This method, in which heat is applied externally, is capable of use only in case at least one of the plies to be united is sufficiently thin to permit the passage of sufficient heat therethrough to cause the setting of the adhesive. If thick parts are to be united, use may be made of the sheeted adhesives described and claimed in my copending application, Serial Number 229,799. In this method a foraminous metal carrier sheet, coated on both sides with a heat-setting adhesive, is inserted between the parts to be united, both of which may be of thick material. The assembly is subjected to pressure in a press and the carrier sheet is heated electrically, thereby generating sufficient heat in the joint to produce the heat-setting of the adhesive. These two methods may, of course, be combined to build up laminated products of any type desired.

My invention can be described in greater detail by reference to the accompanying drawing which shows, more or less diagrammatically two different embodiments of laminated articles within the present invention which can be produced by my process. In this showing Fig. 1 is a sectional view of a laminated product composed of a core of hard wood plies united to thick parts of soft wood on either side, while Fig. 2 is a similar showing of a thick part of hard wood united with a thick part of soft wood.

The figures are supplied with descriptive legends which are believed to be self-explanatory. In Fig. 1 a laminated core of hard wood, such as beech, is shown. This core can be made by conventional methods, the adhesive used being of any type desired but preferably being of the artificial resin type. On both sides of this core is shown a heat-set adhesive film resulting from the use of the sheeted adhesive having a fibrous carrier sheet which is described in the acknowledged Weber patent. This heat-set film of adhesive unites the two intermediate plies of softened wood to the hard wood core as shown. Outside of the plies of softened wood there are shown two thick parts of soft wood united to the softened wood plies by means of films of adhesive. In the joints between these parts there are shown two metal carrier sheets, such as those employed in the sheeted adhesives of my acknowledged copending application.

The article shown in Fig. 1 of the drawing can be readily constructed in accordance with the present invention. This is accomplished by first placing a sheet of adhesive with fibrous carrier on both sides of the hard wood core and then applying two plies of soft wood outside of the adhesive sheets, this assembly being placed in a press provided with heated platens and subjected to heat and pressure. In this operation a sufficient pressure must be applied to cause the adhesive to penetrate into the hard wood core and, as stated previously, this pressure is sufficiently high to cause the compression of the soft wood plies to such an extent that they are hardened. These hardened plies are then softened by methods which, per se, are known in the art, for example by the application of steam or hot water. This moisture softening treatment is conducted in such a manner that the bond of heat-set adhesive beneath the outer plies is not damaged.

When steam or hot water is used to produce softening of the hardened plies in my process it is important that the heat-set bond be of a water resistant adhesive, such as a phenol-formaldehyde resin, for example. After the softening operation, two adhesive sheets, comprising foraminous metal carrier sheets, for example, wire screens coated with a heat-setting adhesive, are placed on both sides of the assembly and then the thick parts of soft wood are applied. This assembly is then placed in a press which does not require heated platens and, during the application of the pressure, an electric current is passed through the metal carrier sheet causing the adhesive with which it is coated to fuse and to penetrate into the soft wood on both sides of the metal as well as to flow into and through the openings in the carrier sheet. The pressure applied in this operation is only sufficient to cause penetration of the adhesive into the soft wood on both sides of the carrier sheet. This pressure is sufficiently low so that neither the soft wood nor the softened wood are hardened during the heat and pressure step. The article produced, as shown in Fig. 1 of the drawing, comprises two thick parts of soft wood joined to relatively thinner, intermediate plies of steam-softened wood which has been subjected to a compression followed by a softening operation, the latter plies being united to a central core of laminated plies of hard wood.

In Fig. 2 a simpler embodiment of my invention is shown which can be produced by first uniting a thin auxiliary ply of soft wood to a thick piece of hard wood, by means of a sheeted adhesive with fibrous carrier followed by the application of heat and pressure in a press supplied with heated platens. During this setting operation the soft wood becomes hardened but can be softened as before by subjection to steam or hot water, for example. The softened auxiliary ply can then be united to a thick part constructed of a fibrous material of a type such as compressed wood pulp, for example, which may be as soft or even softer than soft wood. This is accomplished by laying a sheeted adhesive with metal carrier sheet on top of the softened auxiliary ply, then applying the thick piece of soft fibrous material, placing this assembly in a press and subjecting the same to pressure while passing an electric current through the metal carrier of sufficient strength to heat the adhesive to fusion and setting temperatures. If the thick part is constructed to a material which is softer than the auxiliary ply, it becomes compressed during the pressing operation but its outer layers at least can be softened, if desired, to produce a surface having substantially the properties of the original material. If this part is thin enough it can, of course, be completely softened.

While I have described what I consider to be the best embodiments of my invention it is evident that many modifications can be made in the procedures set forth without departing from the purview of this invention. It is believed to be evident from the preceding description that my process is capable of use in the formation of laminated products of all types from fibrous materials of various types. My invention is characterized by the fact that at least one ply is employed which is of substantially different hardness from that of an adjacent part, this ply being constructed of a material which is capable of being softened. In the process of my invention it is, of course, not necessary to employ an adhesive provided with a carrier sheet and it is not even necessary that the adhesive used be in sheet form. The adhesive may be in liquid form, for example, and may be applied by brushing or dipping operations. When two thick parts are to be united, however, it is necessary to employ metal carrier sheets owing to the fact that the heat from the platens of the ordinary press cannot penetrate thick parts in order to heat the adhesive to setting temperatures. It is possible, of course, to handle the softened auxiliary layer of my invention in the same manner as that in which any other soft wood veneer would be handled in the fabrication of compound lumber. Thus this auxiliary layer may be united with one or several thin plies of fibrous material in a single heat and pressure operation, using an adhesive with or without carrier sheets, in the ordinary press equipped with heated platens, provided that the plies are sufficiently thin to permit the passage of sufficient heat therethrough to cause setting of the adhesive in the several joints. Some of the advantages of my invention can be realized by conducting a process in which no outer part is secured to what I have termed the auxiliary layer or ply, that is, this auxiliary ply can be merely united to another part of relatively harder material followed by the partial or complete softening of the auxiliary ply. It is also possible to employ a thick auxiliary layer which may be secured to a harder part by means of the adhesive provided with a metal carrier sheet for internal electric heating. This thick auxiliary layer can then be softened partially or completely and other parts can be secured thereto by the methods described previously. Other modifications of my invention which fall within the scope of the following claims will be immediately evident to those skilled in this art.

What I claim is:

1. In the process of manufacturing compound lumber wherein at least two pieces of fibrous material which differ substantially in hardness are joined by an auxiliary intermediate layer having a hardness of substantially the same order as that of the softer of said pieces, said auxiliary layer being of fibrous material which is hardened by pressure but which is capable of being softened thereafter, the steps which comprise uniting said auxiliary layer with the harder of said pieces by interposing therebetween a heat setting adhesive and applying heat and pressure sufficient to cause penetration and setting of said adhesive to produce a hard, insoluble and infusible bond, said pressure being sufficient to produce compression and hardening of said auxiliary layer, then softening said auxiliary layer, applying thereto a heat-setting adhesive and placing the softer of said pieces over the adhesive and subjecting the resulting assembly to pressure while heating said adhesive to setting temperatures, the pressure applied being only sufficient to produce satisfactory penetration of said adhesive and being below the pressure applied during the initial heat-and-pressure step.

2. The process of claim 1 wherein the softer of said pieces is too thick to conduct sufficient heat from the platens of a press to cause the setting of said adhesive, and said piece is united with the softened auxiliary layer by interposing therebetween a sheeted adhesive comprising a foraminous metal carrier sheet coated with said adhesive, followed by heating said carrier sheet electrically during the heat-and-pressure step to temperatures producing the fusion and setting of said adhesive.

3. In the manufacture of compound lumber comprising hard and soft wood layers united by a heat-set adhesive, the steps, which comprise uniting a hard piece of wood with a relatively softer piece by interposing therebetween a heat-setting, water-resistant adhesive and subjecting the resulting assembly to heat and pressure sufficient to cause the penetration and setting of said adhesive to form a hard, infusible and insoluble bond, the pressure applied being sufficient to cause the hardening of said softer piece, then softening said softer piece by subjecting it to the action of steam without damaging said bond.

WILLY LÜTY.